CONTROL SYSTEM FOR CONCRETE PUMP

Original Filed July 19, 1968 2 Sheets-Sheet 1

INVENTOR.
AARON M. SCHAIBLE.

CONTROL SYSTEM FOR CONCRETE PUMP

Original Filed July 19, 1968 2 Sheets-Sheet 2

INVENTOR.
AARON M. SCHAIBLE.

United States Patent Office

Re. 27,534
Reissued Dec. 26, 1972

27,534

CONTROL SYSTEM FOR CONCRETE PUMP

Aaron M. Schaible, deceased, late of West Terre Haute, Ind., by J. I. Case Company, assignee, Racine, Wis.

Original No. 3,494,290, dated Feb. 10, 1970, Ser. No. 746,048, July 19, 1968. Application for reissue Jan. 11, 1971, Ser. No. 105,746
Int. Cl. F04b *17/00, 39/08*
U.S. Cl. 417—342 7 Claims

Matter enclosed in heavy brackets [ ] appears in the original patent but forms no part of this reissue specification; matter printed in italics indicates the additions made by reissue.

ABSTRACT OF THE DISCLOSURE

An electro-pneumatic control system for a concrete pump having a pair of power cylinders respectively connected to delivery lines each having an outlet valve therein. Each delivery line has a supply line connected thereto with a supply valve located in each supply line. Pressure fluid is supplied to the power cylinders and to the respective valves through electrically actuated fluid control valves which are controlled by a pair of pressure switches, a manual reversing switch and an automatic reversing switch so that normal reversal of the power cylinders occurs at the end of each stroke after the closing of all of the valves and manual reversal may be achieved at any time in the cycle.

BACKGROUND OF THE INVENTION

The present invention relates generally to pumping units and more particularly to an improved control system for a reciprocating pumping unit.

Portable pumping units for continuously delivering a supply of material, such as concrete, from a source to a specific location at a building site have found considerable commercial success in recent years. These pumping units generally include a pair of reciprocating power cylinders operatively connected to material delivery lines which are interconnected at their outlet ends to a common placement line. A pair of supply lines are respectively connected to the delivery lines and each supply and delivery line has a valve disposed therein.

The cycle of operation normally has the first working piston moving towards the extended position to transfer material from the delivery line into the placement line. During this phase of operation of the first working cylinder, the delivery line valve is open while the supply line valve is closed.

The second working piston is being retracted while the first piston is being extended. During this phase of operation of the second power cylinder the delivery line valve is closed while the supply line valve is open to thereby draw material from a supply source into the delivery line for subsequent passage into the placement line when the reversal of the cycle occurs.

The control of the respective valves and the movement of the power cylinders is generally accomplished through a pressure fluid system which includes control valves selectively actuatable to control the operation of the inlet and outlet or supply and delivery valves as well as the power cylinders. Examples of this type of control system are shown in Patent No. 3,327,641 issued to R. L. Klosterman and No. 3,279,382 issued to M. D. Bennett.

However, the control systems have several serious drawbacks, the primary objection being that the above systems require a complicated valving structure as well as innumerable number of valves for performing the desired function.

Furthermore, in many instances it is desirable and often necessary to reverse the cycle of operation of the unit at points intermediate the extreme positions of the cycle. Thus, there is a desperate need for a simplified control system for controlling the cycle of operation of pumping units.

SUMMARY OF THE INVENTION

The present invention incorporates an electrical control circuit for controlling the position of fluid control valves so that there is a slight delay in reversal of cycling of the power cylinders of a portable concrete pump to prevent surging of the material being pumped. The electrical circuit also incorporates a manual control system for allowing an operator to reverse the cycle of operation at any point during the extension of either of the power cylinders.

The primary object of the present invention is to provide an improved control system for controlling the flow of pressured fluid to find operated rams.

A further object of the invention is to provide an improved control circuit for a concrete pump which is capable of being manually reversed during any point in the phase of operation.

Other objects of this invention will appear in the following description and appended claims reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
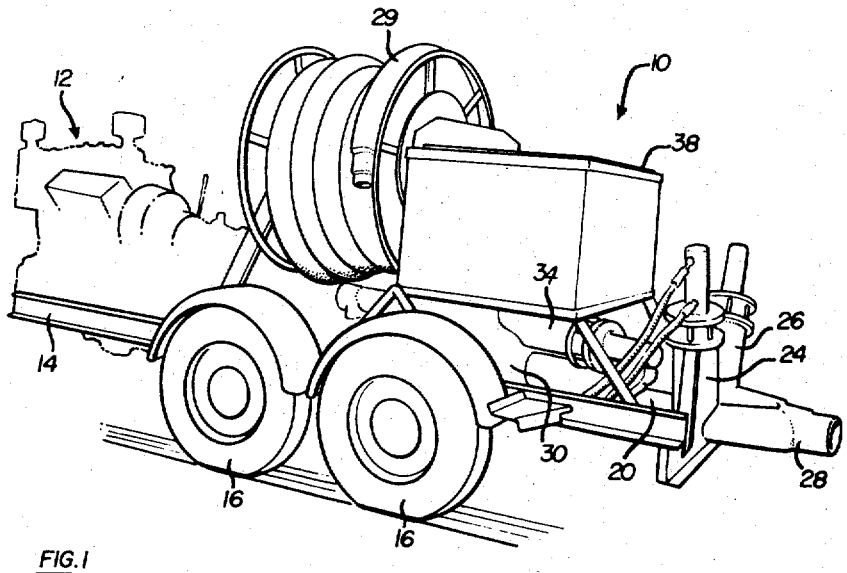
FIGURE 1 of the drawings discloses a perspective view of a portable concrete pump having the control system of the present invention incorporated therein.
Figure 2:
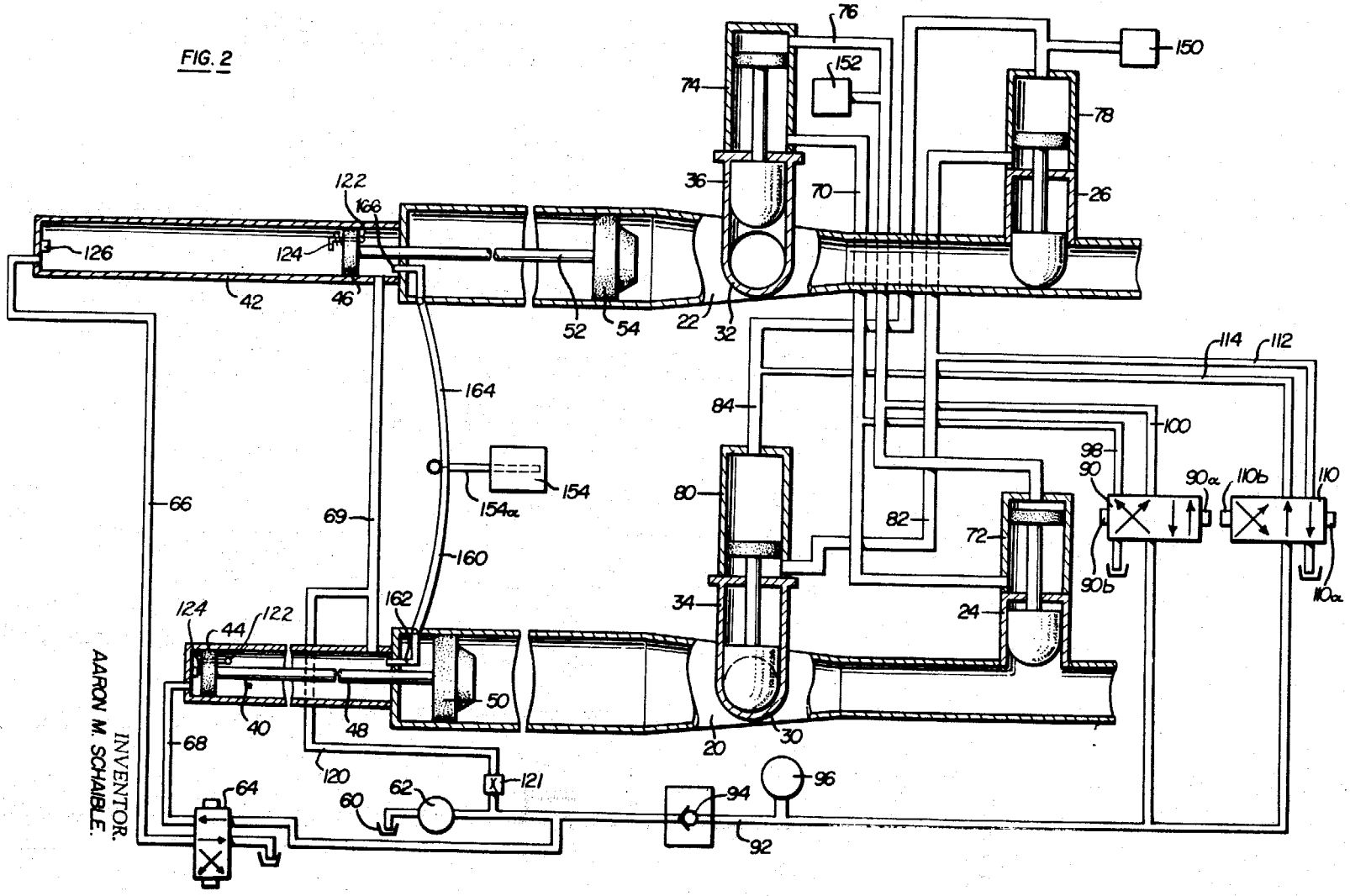
FIGURE 2 schematically illustrates the hydraulic control circuit for the concrete pump disclosed in FIGURE 1.

FIGURES 1 and 2 of the drawings show a commercially available type of portable concrete pump 10. The illustrated embodiment of the concrete pump 10 is shown as being of the trailing type. However, it is readily apparent that the unit may be of the self-propelled type.

The concrete pump 10 includes a conventional power source 12 supported on a frame 14 carried by a pair of sets of wheels 16, only one pair being shown. The concrete pump further includes a pair of delivery lines 20, 22 each having a delivery line valve 24, 27 disposed therein. The outlet end of the respective delivery lines 20, 22 are connected by a Y-connection 28 to produce a single outlet for connecting a conventional placement line 29 which is of the flexible type.

The delivery lines 20, 22 respectively have supply lines 30, 32 connected thereto (only one being shown in FIGURE 1) with supply lines 30, 32 having supply valves 34, 36 disposed therein. The supply lines 30, 32 are in open communication with a conventional hopper 38 which receives material desired to be placed. Of course, the material may be supplied to the hopper in any conventional well-known manner.

Delivery lines 20 and 22, also have respective power or fluid cylinders 40 and 42 connected therto. The cylinders 40 and 42 have the conventional pistons 44 and 46 reciprocating therein with the respective piston rods 48 and 52 connected to concrete placement pistons 50 and 54.

Pressured fluid is supplied from a reservoir or source 60 through a pump 62 and a solenoid actuated control valve 64 to the head end of the respective cylinders 40 and 42 by conduits 66 and 68. The two position control valve 64 is adapted to supply pressure fluid through one of the lines 66 or 68 while connecting the opposite line to the reservoir or drain 60. The rod ends of the respective cylinders 40 and 42 are interconnected by a single conduit 69, and, thus one of the pistons will be extended while the second piston is being retracted.

The control circuit for the respective valves 24, 26, 32 and 34 includes fluid rams connected to said valves with a first conduit 70 interconnecting the rod ends of cylinders 72 and 74 of fluid rams respectively connected to valves 36 and 24 while a second conduit 76 interconnects the head end of the respective cylinders. Likewise, the opposite ends of cylinders 78 nad 80 of fluid rams associated with the respective valves 26 and 34 are interconnected through conduits 82 and 84.

Pressured fluid is selectively supplied to the conduits 70 and 76 through a first solenoid actuated valve 90 having pressured fluid supplied thereto from the pump 62 through a conduit 92 having a normally closed check valve 94 and an accumulator 96 located therein. Conduits 98 and 100 connect the respective conduits 70 and 76 to the control valve 90 so that while pressured fluid is being supplied to one of the conduits, the other of the conduits is connected to the drain. This results in simultaneous extension and retraction of valves 24 and 36.

Likewise, a second solenoid actuated valve 110 receives pressure fluid from conduit 92 and selectively supplies this pressure fluid to conduits 82 and 84 through lines or conduits 112 and 114 and causes simultaneous extension and retraction of valves 26 and 34.

The hydraulic control system also includes means for causing a retraction of one of the placement pistons 52, 54 at a greater rate than the second cylinder or placement piston is being extended. This is accomplished by connecting the outlet of the pump 62 through a conduit 120 having a constant volume valve 121 disposed therein. Thus, as one piston, for example piston 44, is being extended, the fluid in the rod end of the cylinder 40 will be transferred through conduit 69 to the rod end of cylinder 42 to cause a retraction of piston 46. Simultaneous to this action, a constant volume of fluid is being added to conduit 69 through the constant volume restrictor valve 121 to thereby cause a retraction of pistons 46 and 54 at a greater rate than the extension of the pistons 44 and 50.

Each power cylinder also includes means for placing opposite ends of the cylinder in communication with each other during each cycle of operation. This is accomplished by providing a spring biased check valve 122 in each of the pistons 44 and 46. The check valve 122 has a stem 124 which extends beyond the face of the piston at the head end of the cylinder. The stem 124 has an extension disposed towards the center of the cylinder and engages an abutment 126 located on the inner surface of the head end of the cylinder. Thus, as the piston, for example piston 46, reaches the extreme retracted position within cylinder 42, the stem 124 of valve 122 will engage the abutment 126 thereby opening the valve to place opposite ends of the appropriate cylinder 42 in communication with each other to thereby allow the excess fluid which was added by line 120 to be returned to the reservoir 60. Of course, it will be appreciated that this particular arrangement insures that the cylinder will be completely retracted during each cycle of operation thereby insuring a full stroke during the subsequent extension thereof.

The control system for the pumping unit further includes electrical circuit means for controlling the actuation of the respective valves 64, 90 and 110. According to the present invention, the electrical circuitry includes a pair of pressure responsive members or switches 150 and 152, a first automatically actuated reversing switch 154 and a second manually controlled two position reversing switch 156.

The automatically controlled switch 154 is adapted to be actuated and controlled by the extension and retraction of the respective pistons 44 and 46 within cylinders 40 and 42. For this purpose, a lever 160 is pivoted adjacent the rod end of cylinder 40 and has an extension 162 disposed in the path of movement of the piston 44. When the piston 44 reaches the extreme extended position, the leading face thereof will engage the extension 162 thereby pivoting lever or arm 160 to cause a movement of switch arm 154a forming part of the electrical switch 154, for a purpose which will become apparent hereinafter. Likewise, the rod end of cylinder 42 has an arm 164 pivoted adjacent the end thereto with an extension 166 disposed in the path of the piston 46 to cause movement of the switch arm 154a in the opposite direction upon extension of the piston 46.

The respective pressure switches 150 and 152 are operatively connected to the lines 76 and 84, respectively for a purpose which will become apparent hereinafter.

Figure 3:
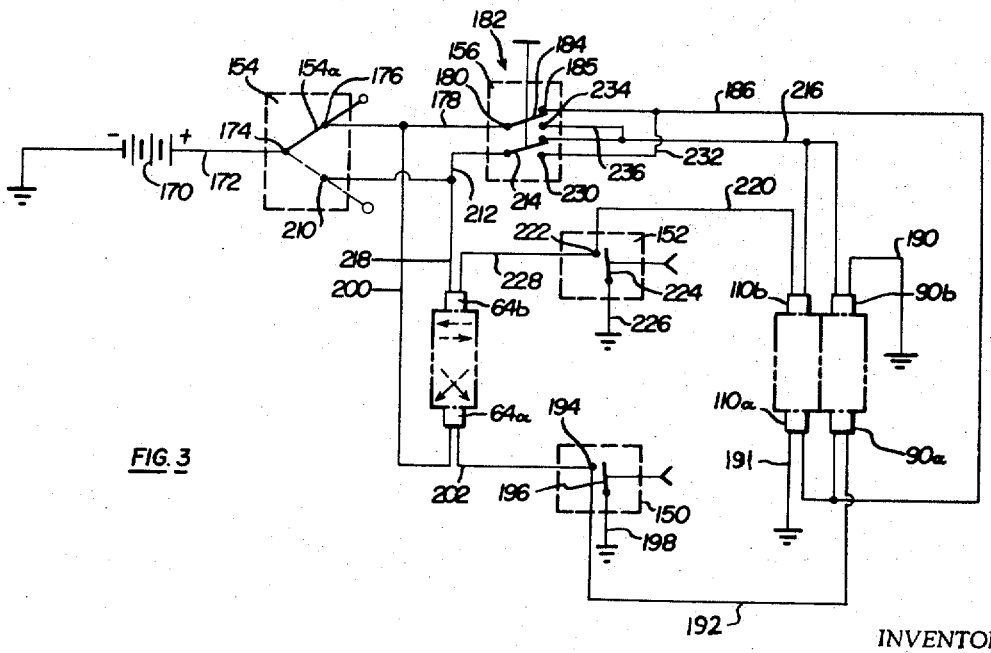
FIGURE 3 shows the electrical circuit performing a part of the control system of the present invention.

The electrical circuitry interconnecting the various solenoids of the respective valves 64, 90, and 110 as well as the switches is shown in more detail in FIGURE 3. An electrical power source 170, such as the conventional battery, has its negative terminal grounded and its positive terminal connected through line 172 to a first contact 174 of switch 154 which has the switch arm 154a operatively connected thereto. A second contact 176 of switch 154 has a first circuit associated therewith which includes line 178 connected to first input terminal 180 of a double pole manual switch 182. With switch arm 184, in the position shown in FIGURE 3, in contact with the first output terminal 185, line 178 is connected to line 186 which is in turn connected to the respective solenoids 90a and 110a of the respective valves. The solenoid **[90*a*]** *110a* has its second contact grounded through line [190] *191* while the second terminal of solenoid **[110*a*]** *90a* is connected through line 192 to a first contact 194 of a normally open pressure switch 150. Switch arm 196 of pressure switch 150 is normally out of engagement with contact 194 and is grounded through line 198, for a purpose which will become apparent hereinafter.

Also, solenoid 64a of power cylinder control valve 64 has one contact connected to line 178 through branch line 200 while the second contact is connected through line 202 to contact 194 of pressure switch 150.

In a like manner contact 210 of the two positioned automatically controlled switch 154 has a second circuit connected thereto which includes line 212 connected to the input contact of switch arm 214 while the first output contact of switch arm 214 is connected through line 216 to the respective solenoids 90b and 110b. Likewise, branch line 218 connects contact 210 to solenoid 64b of valve 64.

The second contact of solenoid 90b is again grounded through line 190 while the second contact of solenoid 110b is connected through line 220 to a first contact 222 of pressure switch 152. Pressure switch arm 224 is normally spring biased away from contact 222 and has its opposite end connected through line 226 to ground. The second contact of solenoid 64b is likewise connected through line 228 to normally open contact 222 of pressure switch 152.

With particular reference again to the manual reversing switch 182 it will be noted that the second output contact 230 associated with switch arm 214 is connected through branch line 232 to line 186 while second output contact 234 associated with switch arm 184 is connected through branch line 236 to line 216, for a purpose which will become apparent hereinafter.

OPERATION

Assume that the electrical circuit is in the position shown in FIGURE 3 with switch arm 154a in contact with terminal 176 and the first circuit is energized.

Assume also that placement piston 50 is being extended and placement piston 54 is being retracted. The delivery and supply valves will be in the position shown in FIGURE 2 and material in delivery line 20 will be forced outwardly through the open delivery valve 24 associated with delivery line 20 while supply line valve 34 will be closed. The valves 26 and 36 will of course be reversed with delivery valve 26 being closed while supply valve 36 is open so that retraction of the placement piston 54 will draw material from the supply hopper into the delivery line 22.

When the fluid piston 44 reaches its extreme extended position, it will engage extension 162 pivoting arm 160 thereby causing switch arm 154a to move into engagement with contact 210 to energize the second circuit. This will supply power to line 212 and through switch arm 214 to line 216 thus energizing grounded solenoid 90b to reverse the position of control valve 90 thereby supplying pressured fluid through conduit means including conduits 100 and 76 to cause a closing of supply valve 36 and delivery valve 24. At the same time power is being supplied to solenoid 64b of control valve 64 and solenoid 110b of valve 110. However, the respective valves will remain in the original position because pressure switch 152 has not been actuated and therefore the solenoids are not grounded. Upon the complete closure of valves 36 and 24, pressure will build up in [conduit] *conduits* 76 and 100 to a point where pressure switch 152 will be actuated. Actuation of pressure switch 152 will ground the respective solenoid 64b and 110b to cause a simultaneous opening of delivery line valve 26 and supply line valve 34 as well as a reversal of valve 64 to cause a reversal of the direction of movement of the respective fluid pistons 44 and 46 and placement pistons 50 and 54.

This condition will remain until piston 46 has reached its extended position thereby actuating switch arm 154a through arm 164 to energize contact 176. The supply of power to contact 176 will cause an immediate energization of grounded solenoid [90*a*] *110a* to close the open valves 26 and 34. After these valves are closed, the increase in pressure in conduit 84 will close pressure switch 150 to ground the solenoids 64b and 110b to again reverse the cycle of operation.

As was indicated above, in many instances reversal of the cycle of operation of the pump is necessary at some point intermediate the ends of the stroke of the power cylinders. This is accomplished by actuating the manual switch 182. Thus actuation of the manual switch 182 may be accomplished at any point in the cycle to cause a reversal of direction of the power pistons 44 and 46.

Of course, it will be appreciated that the normal automatic reversal of the cycle of operation is performed without any surging in the flow of material in the placement line due to the selective actuation of the valves in the above described sequence. Also, the manual reversal of the cycle can be performed at any point in the cycle of operation. For example if it is determined that a particular delivery line is plugged, the cycle of operation may be reversed to unplug the line. It will also be appreciated that the manual reversal of cycle will be smooth and without surging since the reversal steps of a normal reversal of cycle are performed. Thus, during manual reversal, as in automatic reversal the open supply and delivery valves first closed and the opening of the closed supply and delivery lines as well as reversal of direction of the power cylinders is delayed until the closing of the above mentioned open valves is sensed by the circuit.

What is claimed is:

1. A control system for a constant flow pump having a pair of power cylinders each having a piston operatively connected to a delivery line with first and second delivery valves respectively located in said delivery lines, first and second supply lines respectively connected to said first and second delivery lines with a supply valve disposed in each supply line comprising pressured fluid supply means including first electrically actuated control valve means selectively actuatable to supply pressured fluid to extend one of said pistons and retract the other of said pistons and second electrically actuated control valve means operatively connected to each of said valves for (2) opening said first delivery valve and said second supply valve and (2) closing said second delivery valve and said first supply valve, the improvement of electrical circuit means for actuating said control valve means including first switch means actuatable by each of said power cylinders at an extreme position, solenoid means on said second valve means for closing said first delivery valve and said second supply valve, second switch means for sensing the closing of said valves, second solenoid means on said first and second valve means [response] *responsive* to said second switch means for (1) reversing the direction of said power cylinders and (2) opening said second delivery valve and said first supply valve, and third switch means actuatable at any phase in the cycle of operation of said pump for reversing the direction of said power cylinders and the position of said valves.

2. A control system as defined in claim 1, in which said second switch means comprises a pressure responsive switch.

3. In combination with a pumping unit having a pair of power cylinders operatively connected to a pair of delivery lines with supply lines respectively connected to said delivery lines and valves in each of said supply and delivery lines, one of said supply line valves and one of said delivery line valves normally being open, and hydraulic control system including first control valve means actuatable to reverse the position of said supply and delivery valves and second control valve means actuatable to reverse the position of said supply and delivery valves and second control valve means actuatable to reverse the direction of said power cylinders; and electric control system for operating said control valves and including *first and second electric circuits,*

(1) reversing switch means responsive to the movement of said power cylinders to an extreme position and having first and second positions for selectively energizing *said* first and second electric circuits, (2) each of said circuits having (a) first solenoid means connected to said first control valve means for closing the open supply and delivery line valves, (b) second solenoid means connected to said first control valve means for opening the closed supply and delivery line valves, (c) third solenoid means connected to said second control valve means for reversing the direction of travel of said power cylinders, and (d) first means for delaying actuation of said second and third solenoid means until said open supply and delivery valves have closed; and (3) manual switch means operatively connected to said circuits for interconnecting said circuits to actuate said solenoids and cause closing and opening of the associated valves and reversal of direction of said power cylinders at any point intermediate the extreme positions of said power cylinders.

4. In combination with a pumping unit having a pair of power cylinders with piston rods reciprocated therein and operatively connected to a pair of delivery lines, respectively, having first and second supply lines connected thereto with supply and delivery valves in each of said lines, and a hydraulic control circuit including first and second power rams respectively connected to said piston rods, first and second supply rams respectively connected to said supply valves, first and second delivery rams respectively connected to said delivery valves, first control valve means selectively supplying pressured fluid to said power rams to extent one of said rams while retracting the other of said rams, and second control valve means selectively supplying pressured fluid to said supply and delivery rams to (1) close the first supply and second delivery valves and (2) open the second supply and first delivery valves of said valves; an electric control system for controlling said control valve means comprising:

*first and second electric circuits;* first switch means responsive to movement of said power rams to extreme positions for selectively actuating *said* first and second electric circuits;

said electric circuits each including first solenoid means for actuating said second control valve means in response to energizing of the associated circuit to close the first supply and second delivery valves, second solenoid means for actuating said second control valve means for opening said second supply and delivery valves, third solenoid means for actuating said first control valve to reverse the direction of said power rams and means for delaying energization of said second and third solenoids until said first supply and second delivery valves have closed; and second switch means connected to said first and second circuits and operable to reverse the position of said supply and delivery valves and the direction of said power cylinders while said power cylinders are intermediate the extreme positions.

5. The combination as defined in claim 4, in which said means for delaying energization of said second and third solenoids includes pressure responsive switches operatively connected to said hydraulic control circuit for sensing [exercise in] *excessive* pressure in said circuit in response to closing of all of said valves and said second switch means includes a manual switch.

*6. In combination with a pumping unit having a pair of power cylinders with piston rods reciprocated therein and operatively connected to a pair of delivery lines, respectively, having first and second supply lines connected thereto with supply and delivery valves in each of said lines, a hydraulic control circuit including a pressured fluid source; first and second power rams respectively connected to said piston rods, first and second supply rams respectively connected to said supply valves, first and second delivery rams respectively connected to said delivery valves, first control valve means for selectively supplying pressured fluid to said power rams to extend one of said rams while retracting the other of said rams, and second control valve means for selectively supplying pressured fluid to said supply and delivery rams to (1) close the first supply and second delivery valves and (2) open the second supply and first delivery valves of said valves, conduits interconnecting said source with said first and second control valve means, a checkvalve between said valve means and said source preventing flow from said valve means to said source, and an accumulator in said conduits between said checkvalve and said valve means; and an electric control system for controlling said control valve means comprising: first and second electric circuits; first switch means responsive to movement of said power rams to extreme positions for selectively actuating said first and second electric circuits; said electric circuits each including first solenoid means for actuating said second control valve means in response to energizing of the associated circuit to close the first supply and second delivery valves, second solenoid means for actuating said second control valve means for opening said second supply and delivery valves, third solenoid means for actuating said first control valve to reverse the direction of said power rams and means for delaying energization of said second and third solenoids until said first supply and second delivery valves have closed; and second switch means connected to said first and second circuits and operable to reverse the position of said supply and delivery valves and the direction of said power cylinders while said power cylinders are intermediate the extreme positions.*

*7. A control system for a constant flow pump having a pair of power cylinders each having a piston operatively connected to a delivery line with first and second delivery valves respectively located in said delivery lines, first and second supply lines respectively connected to said first and second delivery lines with a supply valve disposed in each supply line comprising pressured fluid supply means including a pressured fluid source, first electrically actuated control valve means selectively actuatable to supply pressured fluid to said power cylinder to extend one of said pistons and retract the other of said pistons and second electrically actuated control valve means operatively connected to each of said valves for (1) opening said first delivery valve and said second supply valve and (2) closing said second delivery valve and said first supply valve, conduits connecting said source to said valve means; a checkvalve in said conduits preventing flow from said valve means to said source, an accumulator in said conduits between said checkvalve and said valve means, further conduits connecting said valve means to said valves and electrical circuit means for actuating said control valve means including first switch means actuatable by each of said power cylinders at an extreme position, solenoid means on said second valve means for closing said first delivery valve and said second supply valve, pressure responsive switch means for sensing the closing of said valves, second solenoid means on said first and second valve means responsive to said pressure responsive switch means for (1) reversing the direction of said power cylinders and (2) opening said second delivery valve and said first supply valve, and manual switch means actuatable at any phase in the cycle of operation of said pump for reversing the direction of said power cylinders and the position of said valves.*

References Cited

The following references, cited by the Examiner, are of record in the patented file of this patent or the original patent.

UNITED STATES PATENTS

| | | | |
|---|---|---|---|
| 2,387,733 | 10/1945 | Balton | 417—900 |
| 2,752,862 | 7/1956 | Boakes | 417—507 |
| 3,279,382 | 10/1966 | Bennett. | |
| 3,279,383 | 10/1966 | Smith | 417—234 |
| 3,327,641 | 6/1967 | Kloskerman | 417—507 |
| 3,405,552 | 10/1968 | Tomita | 417—900 |

WILLIAM L. FREEH, Primary Examiner